United States Patent [19]

Greenwell

[11] 4,219,739
[45] Aug. 26, 1980

[54] STARTER MOTOR-ALTERNATOR APPARATUS

[75] Inventor: Jack E. Greenwell, Reno, Nev.

[73] Assignee: Lear Avia Corporation, Reno, Nev.

[21] Appl. No.: 900,421

[22] Filed: Apr. 27, 1978

[51] Int. Cl.$^2$ ............................................. F02N 11/04
[52] U.S. Cl. .................................. 290/46; 290/38 R; 310/113
[58] Field of Search .............. 322/29, 32, 46; 290/32, 290/38, 46; 310/113, 240

[56] References Cited

U.S. PATENT DOCUMENTS

| | | | |
|---|---|---|---|
| 3,577,002 | 5/1971 | Hall et al. ............................ | 290/46 |
| 3,590,262 | 6/1971 | Sheffield ............................... | 290/46 |
| 3,809,914 | 5/1974 | Kilgore et al. ...................... | 322/29 X |
| 3,908,161 | 9/1975 | Messenger .......................... | 322/29 |
| 3,937,974 | 2/1976 | Lafuze .................................. | 290/38 X |

Primary Examiner—Robert J. Hickey
Attorney, Agent, or Firm—Jackson, Jones & Price

[57] ABSTRACT

A starter-motor, and alternator-generator apparatus for an internal combustion or gas turbine engine wherein the major electro-magnetic circuit of the apparatus is utilized for both the starting and generating functions is disclosed. The rotor may have two windings on it, a main rotor winding that acts as both a starter armature winding and an alternator field winding, and a small exciter armature winding. For slip ring machines the exciter is eliminated. The main rotor winding is wound in progressive simplex lap. The exiter armature or slip rings are connected to this winding at the equalizer connections through a rectifier and automatically activated switch circuit. During starter-motor operation, the main rotor winding is connected in series with its starter field winding through a commutator in a conventional series connected DC machine, and the exciter-armature winding or slip rings are disconnected from the main rotor winding. During alternator-generator operation, the brushes are lifted off the commutator and the exciter-armature winding or slip rings are connected to the main rotor winding.

10 Claims, 2 Drawing Figures

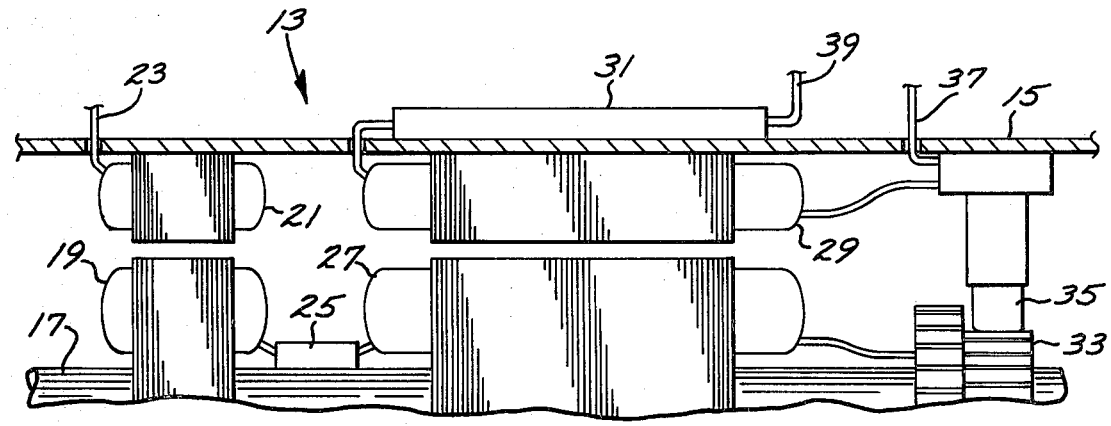
FIG.1
FIG.2
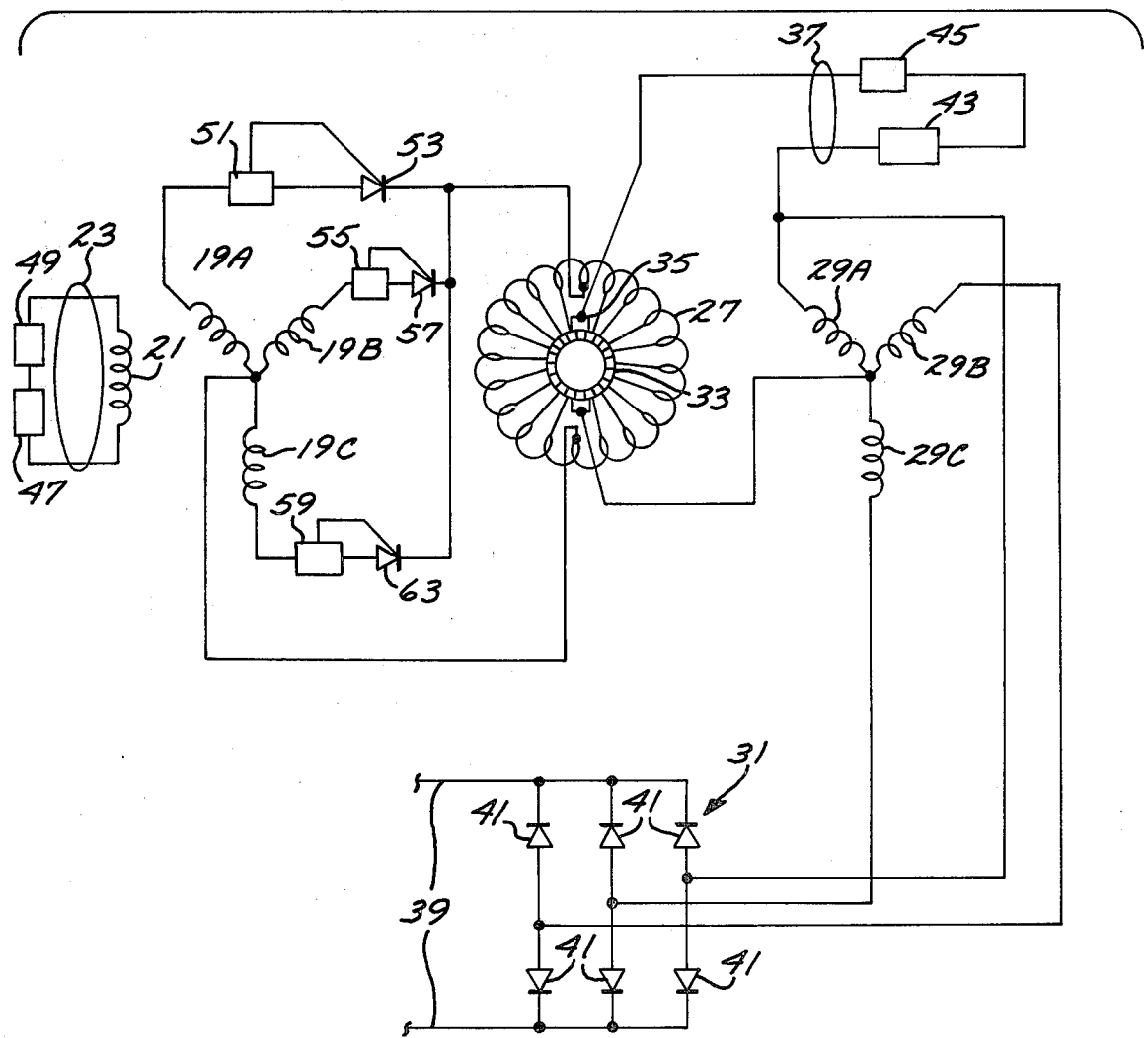

STARTER MOTOR-ALTERNATOR APPARATUS

BACKGROUND OF THE INVENTION

1. Field of the Invention

The present invention relates to electrical machines suitable for use as a motor for the production of mechanical power and for use as an alternator (generator) for the generation of electricity.

2. Description of the Prior Art

In the field of electrical machines which are capable of performing the dual function of DC motor and brushless generator, it has been the practice of employ two separate main electromagnetic circuits wherein the exciter and stator winding pairs are combined on one core and the alternator winding pairs are on another core. Thus, although the electromagnetics are on the same shaft, in essence two separate machines have been combined in one housing. An example of such a device can be found in U.S. Pat. No. 3,577,002. As can be noted, such a device is complicated and consequently relatively expensive to manufacture and maintain.

OBJECTS AND SUMMARY OF THE INVENTION

An object of this invention is to provide and inexpensive low-maintenance starter-alternator apparatus.

Another object of this invention is to provide an apparatus that uses the same electromagnetics (i.e., punchings and windings) to provide both a starting and generating function.

These objects and the general purpose of this invention are provided by an apparatus that utilizes a main rotor winding that acts as an armature winding when the apparatus is functioning as a starter-motor and as a field winding when the apparatus is functioning as an alternator-generator. As a source of DC excitation, an exciter armature is located on the rotor to excite the main rotor winding during alternator-generator operation through a rectifier-automatic switch network. The field for the exciter is on the stator and is energized by a DC current source. As known in the state of the art, the entire exciter/rectifier assembly may be replaced with slip rings. The main rotor winding is connected in series with a starter-field winding through a commutator-brush arrangement. After starter-motor operation is complete, the brushes are lifted off the commutator and the exciter armature winding is engaged. During the alternator-generating operation, the main stator winding acts as an armature winding, generating an AC signal that may be rectified by an appropriate bridge network.

DESCRIPTION OF THE DRAWINGS

The exact nature of this invention, as well as other objects and advantages thereof will be readily apparent from consideration of the following specification in relation to the annexed drawings in which like reference numerals designate like parts throughout the figures thereof, and wherein:

FIG. 1 is an interior elevation of the main components of the starter-alternator apparatus of the present invention.

FIG. 2 is a schematic of the electrical circuits of the present invention.

DESCRIPTION OF THE PREFERRED EMBODIMENTS

A starter-alternator apparatus 13 according to the present invention is illustrated in FIG. 1 as comprising a main stator winding 29 and main rotor winding 27 which act both as the alternator electromagnetics and motor electromagnetics. In addition, an exciter having a stator winding 21 and rotor winding 19 is displaced from the main stator and main rotor windings. The exciter rotor winding is located on the same shaft 17 as the main rotor winding. Only half of the starter-alternator apparatus 13, including shaft 17, is shown. Shaft 17 also carries a commutator 33, brushes 35 and a brush-lifting mechanism 36.

The electromagnetics are contained within a machine housing 15 which has been cut away to expose the interior windings. A main output bridge 39 is shown as mounted on the exterior of the housing 15, although it may be preferable to mount it internally. The rotor winding 19 of the exciter and the main rotor winding 27 of the motor/alternator are connected by way of a solid state commutator 25 consisting of a plurality of rectifiers.

The stator winding 21 of the exciter is a field winding receiving a DC potential at input lines 23 during the time that the starter-alternator apparatus 13 is acting as an alternator. During the time that the apparatus 13 is acting as an alternator, the main bridge 31 generates a DC output on lines 39. Of course, it will be appreciated that if AC is desired, the main output bridge 31 may be dispensed with and the output of the stator winding 29 utilized directly.

The main stator winding 29 acts as an armature winding when the apparatus 13 is functioning as an alternator. During the time when the apparatus 13 is functioning as an alternator, the brush-lifting mechanism 36 is causing the brushes 35 to be out of contact with the commutator 33.

During a starting operation DC potential is supplied over cables 37 to brushes 35, which are in contact with commutator 33. The commutator 33 is a standard commutator utilized on DC motors. DC potential is supplied through the commutator 33 and brushes 35, to the main rotor winding 27, and to the main stator winding 29. The windings are field 29 and armature 27 windings that are preferably connected in series for the starting operation. However, the armature and field windings may also be connected in shunt or in compound, as is well known in the art.

During the motoring function, the brushes 35 are in contact with the commutator 33 and a DC potential is supplied over cables 37 to the main stator and rotor windings 29, 27 respectively, causing the rotor winding 27 to react to the stator field, creating a substantial torque on the main shaft 17. The shaft 17 is attached to a single power take-off pad or an engine. During the motoring function, the solid state bridge 25 is disconnected from the rotating windings 27 to prevent the current induced in the rotating winding 27 from damaging the exciter armature winding 19. As soon as the engine is started and self-sustaining, as a result of the motoring function of the starter-alternator apparatus 13, the torque provided on the shaft 17 by the engine will cause both the exciter-rotor winding 19 and the main-rotor winding 27 to be rotated continuously.

At such time, the brush-lifting mechanism 36 is de-energized causing it to lift the brushes 35 out of contact with the commutator 33. Any standard spring loaded electrical or mechanically actuated brush-lifting mechanism, as is well known in the art, may be utilized for this purpose. At the time the brushes 35 are lifted out of contact with commutator 33, the connection between the exciter-rotor winding 19 and the main rotor winding 27 is completed through the rectifier network 25. The main rotor winding 27 therefore now acts as an alternating field.

At the same time that the brushes 35 are lifted out of contact with commutator 33, the DC potential being supplied to the brushes over cables 37 is disconnected by, for example, a standard solenoid-starter mechanism, as is well known in the art. At the same time that the DC potential at cables 37 is being disconnected, a DC potential is being connected to cables 23 which causes a current flow in the stator-field windings 21 of the exciter.

Although an exciter having a stator field winding 21 and rotor armature winding 19 is shown as providing excitation current for the main rotor winding 27, during the generation function, it should be understood that other sources of excitation current for the main rotor winding 27 may be utilized. For example, a permanent magnet generator may also be used to supply excitation current to the rotor winding 27 during the generation function of the apparatus 13.

Referring now to FIG. 2 which illustrates the preferred electrical circuitry of the apparatus 13 of the present invention, it can be seen that the stator winding 21 of the exciter is a standard field winding consisting of wound poles for DC excitation. The number of poles are conveniently chosen to be consistent with the number of poles in the exciter armature winding 19. The exciter armature winding 19 is shown as an AC output wound rotating three-phase star winding having legs 19A, 19B and 19C. The armature winding 19 may be single or multi-phase as shown in FIG. 2. The three-phase armature winding is connected to the main rotor winding 27 at the equalizer connections 38 and 40 through a plurality of gated rectifying diodes 53, 57 and 63. The main rotor winding 27 is preferably wound as a progressive simplex lap which is well known in the art. Any number of poles consistent with the number of poles utilized in the main stator winding 29 can be utilized on the main rotor winding 27.

The gated rectifiers 53, 57 and 63 supply excitation current to the main rotor winding 27 from their respective legs 19A, 19B and 19C. The rectifiers are triggered closed whenever current flow is sensed in these legs by sensing circuits 51, 55 and 59 respectively. The sensing circuits essentially could be a simple biasing circuit for gating its respective diode on. During the starting mode switch 49 at the input of field winding 21 of the exciter is open thereby preventing the DC source 47 from creating a magnetic field in winding 21. As a result, no current flow is induced into the three legs 19A, 19B and 19C of the threephase star winding of the exciter armature. The sensing circuits 51, 55 and 59 will not provide biasing current and, consequently, the gated diodes 53, 57, 63 respectively, will not be activated. There will effectively be an open circuit between the connection 38 on the main rotor winding 27 and the three legs 19A, 19B and 19C of the exciter armature winding 19. Although gates diodes are shown, other switching arrangements of the electromechanical or static type which are well known could be used, in addition to the rectifying circuits.

The main rotor winding 27 which is preferably a progressive simplex lap acts as a round rotor wound field when the apparatus is in the alternator mode and as a DC armature when the apparatus is in the starting mode. The rotor winding 19 of the exciter is connected via rectifiers to points 38 and 40 of the main rotor winding 27. These points (i.e., 38 and 40) are any two conductors on the winding that are at the same potential, which would be any two conductors that are 360 electrical degrees apart. Although a four-pole connection is shown, any convenient even number of poles consistent with the number of poles in the stator winding 29 may be utilized. One connection on the main rotating winding 27, such as point 40, is connected to the neutral point 20 on the star exciter armature 19. Point 38 is connected to the junction of the three legs 19A, 19B and 19C through the rectifier switches 53, 57 and 63.

The main stator winding 29 is preferably wound in a three-phase star arrangement having three legs 29A, 29B and 29C. During the starting mode, one leg of the star 29A is utilized as the starter field winding. This leg is connected in series with the main rotating winding 27, which acts as an armature during the starting mode. The connection is effected through brushes 35, 42 and commutator 33. Thus, the neutral point 30 of the star main stator winding 39 is connected to brush 42. The other end of winding 29A is connected to a DC potential source 43. This potential source 43 is connected to a brush 35 through a switch 45. During the starting mode, switch 45 is closed and the diode switches 53, 57 and 63 are open. Current will flow in series through field winding 29A and armature winding 27 causing torque to be exerted on the shaft. Although only one leg of the star stator winding is shown as utilized for the DC field during the starting mode, two or three legs could also be utilized. Other configurations than that shown are possible.

Upon the engine to which the apparatus 13 is connected, starting and becoming self-sustaining, the brushes 35, 42 are lifted out of contact with commutator 33, thereby breaking the circuit connections between the field winding 29A and the armature winding 27. At the same time, switch 45 opens disconnecting the DC potential of source 43 from the circuit. Rectifier switches 53, 57 and 63 close, as does switch 49, connecting a DC potential 47 to field winding 21 of the exciter.

In this configuration, the apparatus is now an alternator wherein the rotor winding 27 acts as a rotating field and the stator winding 29 acts as the armature. The switches 45 and 49, as well as brush-lifting mechanism 36 can be initiated by the aircraft starter relay, becoming engaged at the start of the starting cycle and disengaged at the end of the starting cycle.

During the generating mode, the main stator winding 29, acting as an AC armature, supplies an AC signal to the main output bridge 31 which converts the AC to DC, suitable for battery charging or aircraft electrical loads.

What has been disclosed is an inexpensive, low maintenance starter-alternator apparatus that utilizes the same electromagnetics to provide both a starting and generating function. It should be understood, of course, that the foregoing disclosure relates only to a preferred embodiment of the invention and that numerous modifications may be made therein without departing from the spirit and scope of the invention as set forth in the appended claims.

What is claimed is:

1. An electric machine having a rotor and stator portion and adapted to be driven by DC to produce torque for starting an engine, and when driven by such engine, to produce an AC electric output, said machine comprising:
   a main rotor winding;
   a main stator winding;
   a heavy current commutation system including a commutator and brushes connecting said main rotor winding and said main stator winding in series for the production of torque to start said engine;
   an exciter armature winding located on said rotor portion for joint rotation with said main rotor winding;
   an exciter field winding on said stator portion coacting with said exciter armature winding;
   a controlled rectifier set connected between the exciter-armature winding and the main rotor winding for feeding DC from AC generated by said exciter-armature winding to said main rotor winding; and
   an automatically activated gate switching means connected between said controlled rectifier set and said main rotor winding, said switch means being open when said machine is driven by DC to produce torque and closed when driven by said engine to produce an AC electric output.

2. The electric machine of claim 1 wherein said main rotor winding is wound as a progressive simplex lap.

3. The electric machine of claim 1 wherein said main stator winding is a three-leg star, only one leg of said star winding being connected in series with said main stator winding by said current commutator system.

4. The electric machine of claim 1 further comprising an automatic brush-lifting mechanism which lifts the brushes out of contact with the commutator when a starting operation has been completed.

5. The electric machine of claim 1 wherein the exciter armature winding, including said controlled rectifier set is connected to two points on said main rotor winding that are 360 electrical degrees apart.

6. The electrical machine of claim 1 wherein said automatically activated switch means responds to current flow in said exciter armature winding to close, and the lack of current flow therein to open.

7. The electrical machine of claim 1 further comprising means for rectifying the AC electric output of said main stator winding to DC.

8. An electric machine having a rotor and a stator portion and adapted to be driven by DC to produce torque for starting an engine, and when driven by such engine for producing an AC electric output, said machine comprising:
   a rotor winding;
   a stator winding;
   a heavy current commutation system, including a commutator and brushes connecting said rotor winding and said stator winding in series for the production of torque to start said engine;
   means for generating DC;
   means for lifting the brushes out of contact with the commutator when said rotor portion is driven by said engine; and
   means for automatically feeding DC from said DC generating means to said rotor winding when said rotor portion is driven by said engine;
   whereby said rotor winding acts as a motor armature winding during starting operations and as an alternator field winding during generating operations.

9. An electric machine having a rotor and a stator portion and adapted to be driven by DC to produce torque for starting an engine, and when driven by such engine for producing an AC electric output, said machine comprising:
   a rotor winding;
   a stator winding;
   means for connecting said stator winding and said rotor winding in series for the production of torque to start said engine;
   means for generating DC;
   means for disconnecting said stator winding and said rotor winding when said engine has started and said rotor portion is driven by said engine; and
   means for automatically exciting said rotor winding with DC from said DC generating means when said rotor portion is driven by said engine.

10. The electric machine of claim 9 wherein said connecting and disconnecting means, and said exciting means, are automatically activated.

* * * * *